Nov. 18, 1969    D. C. MILLER    3,479,011
JACK FOR RAISING MOTOR VEHICLE WHEELS
Filed May 9, 1967
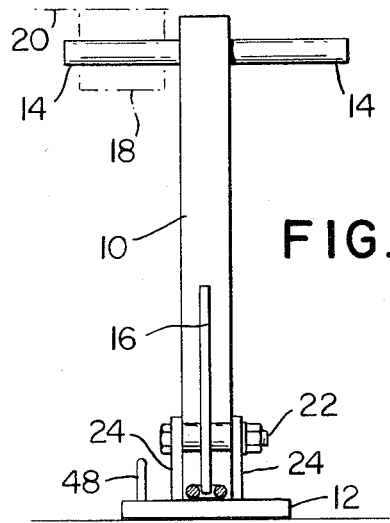
FIG_1
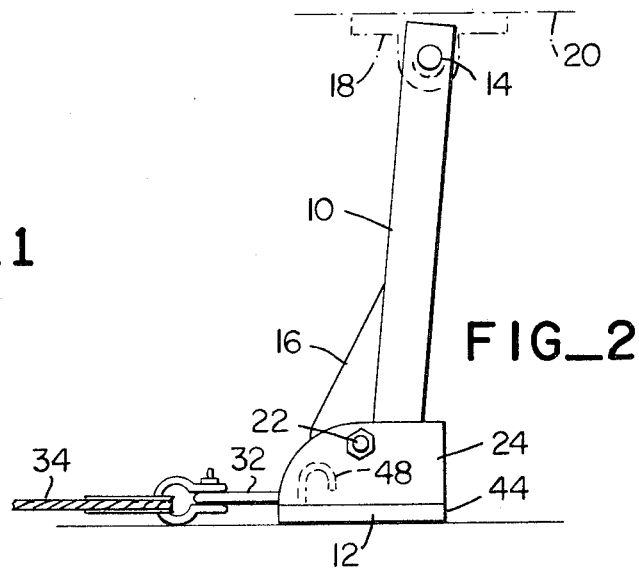
FIG_2
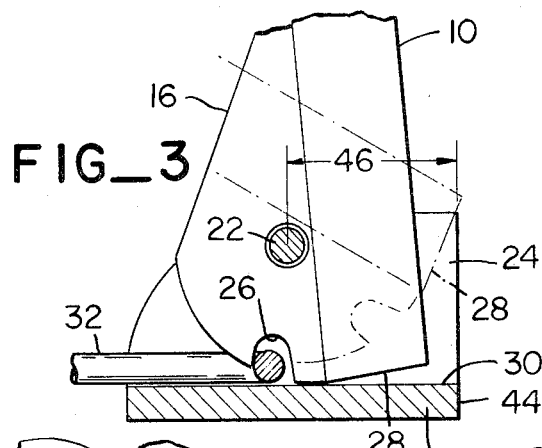
FIG_3
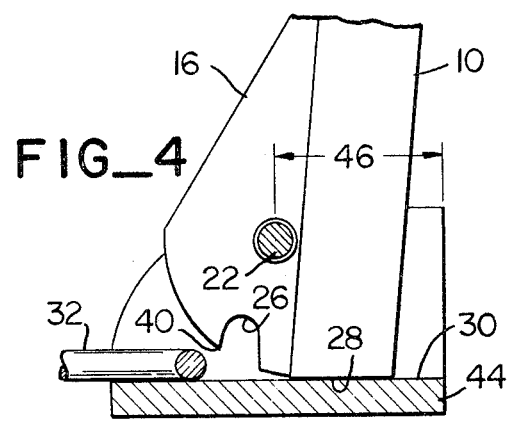
FIG_4
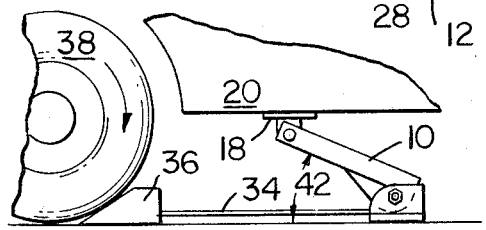
FIG_5
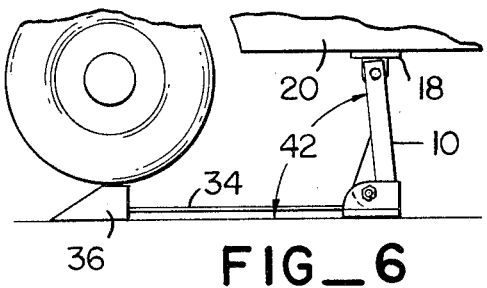
FIG_6
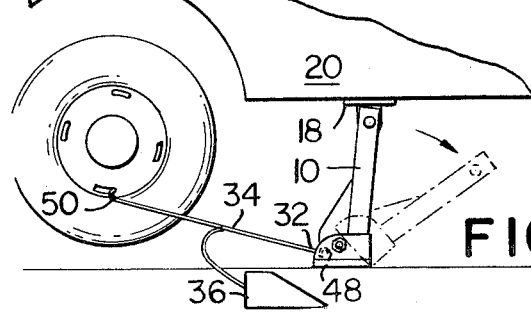
FIG_7
INVENTOR.
DANIEL C. MILLER
BY Townsend and Townsend
ATTORNEYS

United States Patent Office 3,479,011
Patented Nov. 18, 1969

3,479,011
JACK FOR RAISING MOTOR
VEHICLE WHEELS
Daniel C. Miller, 195 Alhambra Way, Apt. 5,
San Francisco, Calif. 94123
Filed May 9, 1967, Ser. No. 637,288
Int. Cl. B66f 7/24
U.S. Cl. 254—94                                         7 Claims

ABSTRACT OF THE DISCLOSURE

A jack for raising the wheels on one side of a motor vehicle by moving the vehicle under its own power, having a leg, one end of which is pivotally mounted on a base and the other end of which is to be pivotally affixed to the underframe of the vehicle, and a releasable connection between the base and a drive wheel of the vehicle.

---

This invention relates to vehicle jacks, and, more particularly, to a vehicle jack for lifting selected wheels of automobiles, trucks and similar motor vehicles off the ground through the use of the vehicle's own power.

In order to raise the wheel of an automobile or truck or other motor vehicle, it is usual to use a bumper jack which may be hydraulic, friction, or screw-operated, or a low-profile jack to slip under the vehicle, usually of the hydraulic or screw-operated scissors type.

The present invention is designed to raise one or more wheels of a motor vehicle from the ground by utilizing the motive power of the vehicle itself thus requiring no effort by the driver in raising a wheel. The invention then holds the vehicle wheels raised so that a flat tire may be changed or chains installed or other adjustments made.

This is accomplished by the interconnection of a lever, or leg pivotally mounted under the frame of the motor vehicle, to one of the drive wheels of the vehicle. As the vehicle is moved under its own power, the leg, the lower end of which is on the ground and held in place by the connection between the leg and the drive wheel, pivots until it is vertical. The pivoting action raises the frame since the leg is long enough to hold the frame sufficiently high to cause one or more wheels to be lifted off the ground.

The interconnection between the leg and the drive wheel serves a dual purpose. First, when the drive wheel is resting on the ground, the connection between it and the leg holds the lower end of the leg in a fixed position on the ground so that as the vehicle moves forward, the leg will pivot and raise the frame of the vehicle. Second, the interconnection prevents the drive wheel from spinning as it is raised from the ground by the raising of the vehicle frame. The drive wheel must be prevented from spinning in order to permit the drive wheel to be fully raised under power, since in most motor vehicles, if one of the drive wheels is raised, no torque is transmited to the other drive wheel.

In the preferred embodiment a wedge-shaped block is utilized to keep the drive wheel from turning, although other means to restrain the wheel from free movement as it is raised may be used. The wedge-shaped block also serves to aid the lifting process by causing the drive wheel to be raised as it moves along the inclined surface of the block. The raising of the drive wheel raises the vehicle thus permitting the leg easily to assume the vertical, vehicle-supporting position.

An additional feature of the present invention resides in provision for releasing the interconnection member from the leg when the leg reaches the vertical position and the vehicle is raised. Releasing the interconnection member permits the drive wheel to spin, thus releasing the thrust on the vehicle and reducing the likelihood of driving off the upraised jack. If the wedge-shaped block is used, release of the interconnection member permits the block to be thrown clear by the drive wheel as the wheel starts to turn freely.

Still another feature of the present invention is the configuration of the leg and base, and more particularly, the location of the pivot point of the leg on the base with respect to the leading edge of the base. The lower end of the leg is cut at an angle of about 5° so that the leg will rest upright at an angle of approximately 5° from the vertical. Should the vehicle continue its movement because of its momentum or if, for some reason, the release mechanism does not permit the drive wheel to be released so that power continues to be applied to move the vehicle forward, the entire leg and base combination will be tilted forward so that the vehicle will be safely lowered to the ground.

The provision in the preferred embodiment that the leg rest at an angle of 5° from the vertical permits safer operation of the jack by making blocking of the vehicle wheels unnecessary.

The present invention therefore permits one or more wheels of a motor vehicle to be raised quickly, simply, and without effort through the use of the vhicle's own engine. This is a result not known heretofore to be available in any device or apparatus.

Other features and advantages of the present invention will become apparent upon reading the following specification and referring to the accompanying drawings in which corresponding numerals represent corresponding parts in each of he several views.

In the drawings:

FIG. 1 is a front view of the jack in the upright, or vehicle-holding, position;

FIG. 2 is a side view of the jack in the same position and shows the link between the jack and the drive wheel;

FIG. 3 is an enlarged fragmentary view of the lower end of the jack showing the link of the connection to the drive wheel being locked in place;

FIG. 4 is a similar enlarged fragmentary view showing the release of the interconnection link when the leg of the jack is in the vertical position or beyond;

FIG. 5 is a fragmentary view of the jack in place under the vehicle and showing a drive block connected to the jack, with the drive wheel beginning to ride up the drive block;

FIG. 6 shows the drive wheel raised up on the block with the lever arm almost vertical and just prior to the release of the interconnection link; and FIG. 7 shows the jack resting in a position approximately 5° beyond the vertical with the vehicle raised and the wheel of the vehicle raised off the ground. The broken lines in the figure show the overturning of the jack upon moving the vehicle forward.

The general arrangement of the jack is shown in FIGS. 1 and 2. The jack comprises a leg 10 which is pivotally mounted on a base 12. Mounted at the upper end of the leg is a round bar 14 which passes through and is fixed in the leg. A reinforcing web 16 is affixed to the leg along its rear face. Either end of the bar 14 is adapted to be received in a support 18 permanently affixed to the underside of the frame 20 of a motor vehicle. In the specification which follows, the preferred embodiment will be described with respect to its use on an automobile, although the invention is not to be understood to be limited to such use.

The leg 10 is pivotally mounted by means of a heavy bolt or rivet 22 between the side members 24 of the base portion. The lower end of the web 16 is formed with a notch 26. The bottom portion 28, of the leg 10, which will rest on the upper surface 30 of the base member 12 when the leg is approximately vertical, cut at an angle of approximately 5° so that the leg 10 will normally rest at an angle of approximately 5° from the vertical as shown in FIG. 2.

The notch is shaped to receive the link 32 which link is in turn connected to a flexible connector 34 which may be a chain or nylon rope. The rope 34 is permanently connected to the drive block 36 shown in FIGS. 5 and 6.

In order to prepare the jack for raising the vehicle, the link 32 is inserted under the outer edge 40 of the notch 26 at the lower end of the web 16. The leg is then moved to the acute angle position shown in FIG. 5 and the bar 14 inserted in the support 18 affixed to the underside of the frame 20 of the vehicle adjacent one side of the vehicle. Drive block 36 is placed directly in front of the drive wheel 38 on that side of the vehicle. The length of the rope 34 is adjustable so that when the jack is in position as shown in FIG. 5 with the drive block 36 directly in place in front of the wheel 38, the rope 34 will be no longer than the distance between the block 36 and the base of the jack on the ground beneath the vehicle.

The next step is to slowly apply power to the vehicle so that torque is applied to the wheel 38. The wheel 38 will slowly rotate and begin to rise up on the block 36. As the vehicle moves forward, the angle 42 between the leg 10 of the jack and the ground will become less acute. Since the block is firmly pressed against the ground by the weight of the vehicle carried on wheel 38, and the base 12 of the jack is firmly connected by rope 34 to the block, the base cannot slide forward along the ground. Therefore the forward motion of the car is translated into an elevating action by the pivoting of the jack leg 10 on the base 12.

When the leg 10 reaches the vertical position with the angle 42 being approximately 90°, the space between edge 40 and the upper surface 30 of the base 12 is just enough to permit the link 32 to be withdrawn from the notch 26. The release of tension on the rope 34 caused by the release of the link 32 will permit the torque applied to wheel 38 to throw the block 36 out behind the vehicle. Since wheel 38 no longer is in constant with the ground or the block, the wheel will spin. As it begins to spin, the forward power on the vehicle is automatically cut off, preventing inadvertent driving of the vehicle off the jack.

The momentum of the vehicle will carry the leg of the jack slightly past the vertical to a rest position in which surface 28 at the lower end of the leg 10 will rest against the upper surface 30 of the base 12.

The pivot position of the leg 10 with respect to the base is at the bolt or rivet 22. The distance between the center line of the rivet 22 and the leading edge 24 of the base 12 is designated as 46. This distance is chosen so that substantially more overturning force is required to drive off the jack as shown in FIG. 7 than the normal momentum of the vehicle as it is driven up on the jack.

With the leg resting in the position approximately 5° from the vertical as shown in FIG. 7, the vehicle frame is raised sufficiently off the ground so that the wheel 38, which is attached to the frame of the vehicle by springs, will hang down from the frame but will be raised from the ground so that the wheel may be removed, chains applied to the wheel or other work done.

The location of the supports 18 on the frame of the vehicle, one adjacent each side of the vehicle, is chosen so that both the drive wheel and the front wheel of the vehicle on that side are raised simultaneously. This location may be easily found by use of an ordinary jack under the frame to find the point of balance fore and aft of the motor vehicle.

The distance 46 between the pivot point and the leading edge 44 of the base also permits the motor vehicle to be driven off the jack as easily as it is driven on. When the wheel 38 is raised from the ground as in FIG. 7, no motive power can be applied to the vehicle. In order to permit the vehicle to be moved, the base of the jack is provided with a hook 48. The hook 48 permits a rope or chain similar to rope or chain 34 to be connected from the hook 48 to the wheel 38 to prevent the wheel from spinning. This is shown in FIG. 7.

The rope 34 may be provided with an extension having a hook 50 to be inserted in one of the slots normally found in the rim of the wheel 38. Link 32 is then slipped over the hook 48 and the length of rope 34 adjusted so that there is no slack. If power is then applied to the wheel 38, the connection between the wheel and the base of the jack will prevent the wheel from spinning, thus permitting the motive power to be applied through the opposite wheel and the car driven off the jack as shown by the broken lines in FIG. 7.

These and other modifications of my invention may be practiced, it being understood that the form of my invention as described above is to be taken as a preferred example of the same. Such desciption has been by way of illustration and example for purposes of clarity and understanding. Changes and modifications may be made without departing from the spirit of my invention as limited only by the scope of the appended claims.

I claim:

1. A jack for raising at least one wheel of a motor vehicle off the ground comprising: a leg pivotally mounted on the underside of the motor vehicle movable from a first position in non-load bearing contact with the ground to a substantially vertical second position in load bearing contact with the ground, said leg being of sufficient length to hold a wheel of the vehicle off the ground when the leg is in said second position; connection means engageable with the leg and with a drive wheel of the vehicle to cause pivoting movement of the leg from the first position to the second position as the vehicle is moved under its own power; said connection means including drive wheel restraining means for restraining free rotation of the drive wheel when the leg assumes the vertical position and a wheel of the vehicle is raised off the ground.

2. The jack of claim 1 and including latch means for engaging the connection means with the leg; and means to release the latch means when the leg is in the second position.

3. The jack of claim 1 and including a base, adapted to be engaged between the leg and the ground for supporting the leg on the ground.

4. The jack of claim 1 and wherein the drive wheel restraining means comprises a block; and wherein said block is formed with an inclined surface at one end thereof extending from the underside of the block to its upper surface; and wherein the height of the upper surface of the block is sufficient to cause the drive wheel to be raised, thereby raising the vehicle to an elevation at which the leg will move to the second position.

5. A jack for raising and supporting one side of a motor vehicle comprising: a base; a leg having a first end and a second end; said first end pivotally mounted on the base; said second end pivotally mounted on the underside of the vehicle near one side of the vehicle for pivotal movement between a first position and second substantially vertical position; the leg having sufficient length to support that side of the vehicle off the ground when the leg is extended vertically beneath the vehicle in the second position; the leg being at an acute angle to the underside of the vehicle when the leg is in the first position and the base is in contact with the ground; a connector having one end thereof connected to the leg; and means engageable between the ground and the drive wheel on said side of the vehicle for restraining free rotation of the drive wheel as the side of the vehicle is raised, whereby the application of power to the drive wheels of the vehicle will cause movement of the vehicle and movement of the leg from the first position to the second position thereby raising the side of the vehicle and supporting the side of the vehicle in the raised position, said engageable means including a block affixed to the other end of the connector and adapted to be wedge between said drive wheel of the vehicle and the ground so that the bottom of the leg will be held by the connector in a fixed position on the ground as the leg pivots on the underframe from the first position to the second position as the vehicle is moved forward by the application of torque to said drive wheel; said including means to disengage said connector from the leg when the leg is pivoted to the second position to thereby allow disengagement of the block from its wedged position between the ground and the drive wheel.

6. The jack of claim 5 and including means for restraining a raised drive wheel from free rotation under power when the vehicle underframe is supported on the leg comprising: means for connecting the raised drive wheel to the supporting leg so that when power is applied to the drive wheel the vehicle will move and the leg will pivot from the second position and the underframe be lowered.

7. The jack of claim 6 and wherein the first end of the leg is provided with a sloping end surface, the slope of which is approximately 5°, said sloping surface adapted to engage the base so that the leg will be supported at an angle of approximately 5° from the vertical; and wherein the pivotal mounting of the first end of the leg is spaced from the edge of the base to permit the base to pivot with the leg when power is applied to the raised drive wheel so that the underframe may be lowered.

References Cited
UNITED STATES PATENTS

| | | | |
|---|---|---|---|
| 1,970,172 | 8/1934 | Hull | 254—88 |
| 2,343,459 | 3/1944 | Hines | 254—94 |

ROBERT C. RIORDON, Primary Examiner

D. MELTON, Assistant Examiner